US010198804B2

United States Patent
Sungkorn et al.

(10) Patent No.: US 10,198,804 B2
(45) Date of Patent: Feb. 5, 2019

(54) METHOD FOR DETERMINING FABRIC AND UPSCALED PROPERTIES OF GEOLOGICAL SAMPLE

(71) Applicant: Ingrain, Inc., Houston, TX (US)

(72) Inventors: Radompon Sungkorn, Houston, TX (US); Anyela Morcote, Houston, TX (US); Gustavo Carpio, Houston, TX (US); Gabriela Davalos, Houston, TX (US); Jonas Toelke, Houston, TX (US); Avrami Grader, Houston, TX (US); Naum Derzhi, Houston, TX (US); Yaoming Mu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/098,403

(22) Filed: Apr. 14, 2016

(65) Prior Publication Data

US 2016/0307312 A1     Oct. 20, 2016

Related U.S. Application Data

(60) Provisional application No. 62/147,977, filed on Apr. 15, 2015.

(51) Int. Cl.
| | | |
|---|---|---|
| *G06T 7/41* | (2017.01) | |
| *G06T 7/00* | (2017.01) | |
| *G06K 9/46* | (2006.01) | |
| *G06T 7/11* | (2017.01) | |

(Continued)

(52) U.S. Cl.
CPC ........ *G06T 7/0004* (2013.01); *G06K 9/00201* (2013.01); *G06K 9/4604* (2013.01); *G06K 9/4671* (2013.01); *G06K 9/6272* (2013.01); *G06T 7/11* (2017.01); *G06T 7/41* (2017.01); *G06T 2200/04* (2013.01); *G06T 2207/20064* (2013.01); *G06T 2207/20081* (2013.01)

(58) Field of Classification Search
CPC . G06T 7/0004; G06T 7/41; G06T 7/11; G06T 2207/20081; G06T 2207/20064; G06T 2200/04; G01N 33/24; G06K 9/4604; G06K 9/52; G06K 9/6267; G06K 9/6218; G06K 9/66

See application file for complete search history.

(56) References Cited

U.S. PATENT DOCUMENTS

| | | | |
|---|---|---|---|
| 6,011,557 A | * | 1/2000 | Keskes .................. G01V 1/301 345/426 |
| 6,711,293 B1 | | 3/2004 | Lowe |

(Continued)

FOREIGN PATENT DOCUMENTS

| | | | | |
|---|---|---|---|---|
| CA | 2646857 A1 | * | 11/2009 | .......... G01N 23/046 |
| CN | 103530621 A | * | 1/2014 | |

OTHER PUBLICATIONS

Lepistö, Leena, Iivari Kunttu, and Ari Visa. "Classification of natural rock images using classifier combinations." Optical Engineering 45, No. 9 (2006): 097201-097201.*

(Continued)

*Primary Examiner* — Carol Wang
(74) *Attorney, Agent, or Firm* — Chamberlain Hrdlicka

(57) ABSTRACT

A method for determining fabric and upscaled properties of a geological sample, such as a rock sample. A system for the method also is provided.

10 Claims, 9 Drawing Sheets

Flow diagram of present rock fabric analysis method.

(51) Int. Cl.
G06K 9/62 (2006.01)
G06K 9/00 (2006.01)

(56) References Cited

U.S. PATENT DOCUMENTS

2011/0091078 A1* 4/2011 Kherroubi .............. G01V 11/00
382/109
2012/0221306 A1* 8/2012 Hurley ................. G01V 99/005
703/6

OTHER PUBLICATIONS

Lowe, David G. "Distinctive image features from scale-invariant keypoints." International journal of computer vision 60, No. 2 (2004): 91-110.*

Lepistö, Leena, Iivari Kunttu, Jorma Autio, and Ari Visa. "Rock image classification using non-homogenous textures and spectral imaging." (2003).*

Singh, Naresh, T. N. Singh, Avyaktanand Tiwary, and Kripa M. Sarkar. "Textural identification of basaltic rock mass using image processing and neural network." Computational Geosciences 14, no. 2 (2010): 301-310.*

Pitas, I., and C. Kotropoulos. "Texture analysis and segmentation of seismic images." In Acoustics, Speech, and Signal Processing, 1989. ICASSP—89., 1989 International Conference on, pp. 1437-1440. IEEE, 1989.*

Translated Version of CN103530621.*

Chatterjee, Snehamoy. "Vision-based rock-type classification of limestone using multi-class support vector machine." Applied intelligence 39, No. 1 (2013): 14-27.*

Nguyen, Huu-Giao, Ronan Fablet, and Jean-Marc Boucher. "Invariant descriptors of sonar textures from spatial statistics of local features." In Acoustics Speech and Signal Processing (ICASSP), 2010 IEEE International Conference on, pp. 1674-1677. IEEE, 2010.*

Nguyen, Huu-Giao, Ronan Fablet, Axel Ehrhold, and Jean-Marc Boucher. "Keypoint-based analysis of sonar images: application to seabed recognition." IEEE Transactions on Geoscience and Remote Sensing 50, No. 4 (2012): 1171-1184.*

Zhang, Zhe, and Goldie Nejat. "Robot-assisted intelligent 3D mapping of unknown cluttered search and rescue environments." In Intelligent Robots and Systems, 2008. IROS 2008. IEEE/RSJ International Conference on, pp. 2115-2120. IEEE, 2008.*

Andra et al., "Digital rock physics benchmarks—Part I: Imaging and segmentation," Computers & Geosciences 50, 2013, pp. 25-32.

Andra et al., "Digital rock physics benchmarks—Part II: Computing effective properties," Computers & Geosciences 50, 2013, pp. 33-43.

Antel et al., "Automated detection of focal cortical dysplasia lesions using computational models of their MRI characteristics and texture analysis," NeuroImage 19, 2003, pp. 1748-1759.

Botha et al., "Multi-Scale Imaging and Cross-Property Correlations in Heterogenous Sandstone," International Symposium of the Society of Core Analysts, Avignon, France, SCA2014-021, Sep. 8-11, 2014, pp. 1-12.

Curtis et al., "Investigation of the Relationship between Organic Porosity and Thermal Maturity in the Marcellus Shale," SPE144370, SPE North American Unconventional Gas Conference and Exhibition, The Woodlands, Texas, USA, Jun. 14-16, 2011, pp. 1-4.

Curtis et al., "Mapping of Organic Matter Distribution on the Centimeter Scale with Nanometer Resolution," URTeC 1922757, Unconventional Resources Technology Conference, Denver, Colorado, USA, Aug. 25-27, 2014, pp. 980-987 (pp. 1-8).

Curtis et al., "Structural Characterization of Gas Shales on the Micro- and Nano-Scales," CUSG/SPE 137693, Canadian Unconventional Resources & International Petroleum Conference, Calgary, Alberta, Canada, Oct. 19-21, 2010, pp. 1-15.

Dvorkin et al., "Relevance of computational rock physics," Geophysics, vol. 76, No. 5, Sep.-Oct. 2011, pp. E141-E153.

Ehrenberg, S.N., "Whole core versus plugs: Scale dependence of porosity and permeability measurements in platform carbonates," AAPG Bulletin, vol. 91, No. 6, 2007, pp. 835-846.

Goergen et al., "Integrated Petrophysical Properties and Multi-Scaled SEM Microstructural Characterization," URTeC 1922739, Unconventional Resources Technology Conference, Denver, Colorado, USA, Aug. 25-27, 2014, pp. 1-10.

Haralick, R.M., "Statistical and Structural Approaches to Texture," Proceedings of the IEEE, vol. 67, No. 5, May 1979, pp. 786-804, (23 pages).

Hu et al., "Automatic Segmentation of High-resolution Satellite Imagery by Integrating Texture, Intensity, and Color Features," Photogrammetric Engineering & Remote Sensing, Dec. 2005, pp. 1399-1406.

Jin et al., "An Automated Machine-Learning Procedure for Robust Classificatin of SEM Images of Cross-Laminated Sandstones for Digital Rock Analysis," SCA2014-034, International Symposium of the Society of Core Analysts, Avignon, France, Sep. 8-11, 2014, pp. 1-6.

Lemmens et al., "Multiscale Imaging of Shale Samples in the Scanning Electron Microscope," in W. Camp, E. Diaz, B. Wawak, eds., Electron microscopy of shale hydrocarbon reservoirs: AAPG Memoir 102, 2013, pp. 27-35.

Materka et al., "Texture Analysis Methods—A Review," Technical University of Lodz, Institute of Electronics, COST B11 report, Brussels, 1998, pp. 1-33.

Melendez et al., "Unsupervised texture-based image segmentation through pattern discovery," Computer Vision and Image Understanding 115, 2011, pp. 1121-1133.

Signolle et al., "Wavelet-Based Multiscale Texture Segmentation: Application to Stromal Compartment Characterization on Virtual Slides," Signal Processing, Elsevier, 2010, 90 (8), pp. 2412-2422 (pp. 1-12, 13 pages).

Sungkorn et al., "Multi-Scale and Upscaling of Digital Rock Physics With a Machine That Can Learn About Rocks," SCA2015-A050, International Symposium of the Society of Core Analysts, St. John's Newfoundland and Labrador, Canada, Aug. 16-21, 2015, pp. 1-12.

Unser, M., "Texture Classification and Segmentation Using Wavelet Frames," IEEE Transactions on Image Processing, vol. 4, No. 11, 1995, pp. 1549-1560.

* cited by examiner

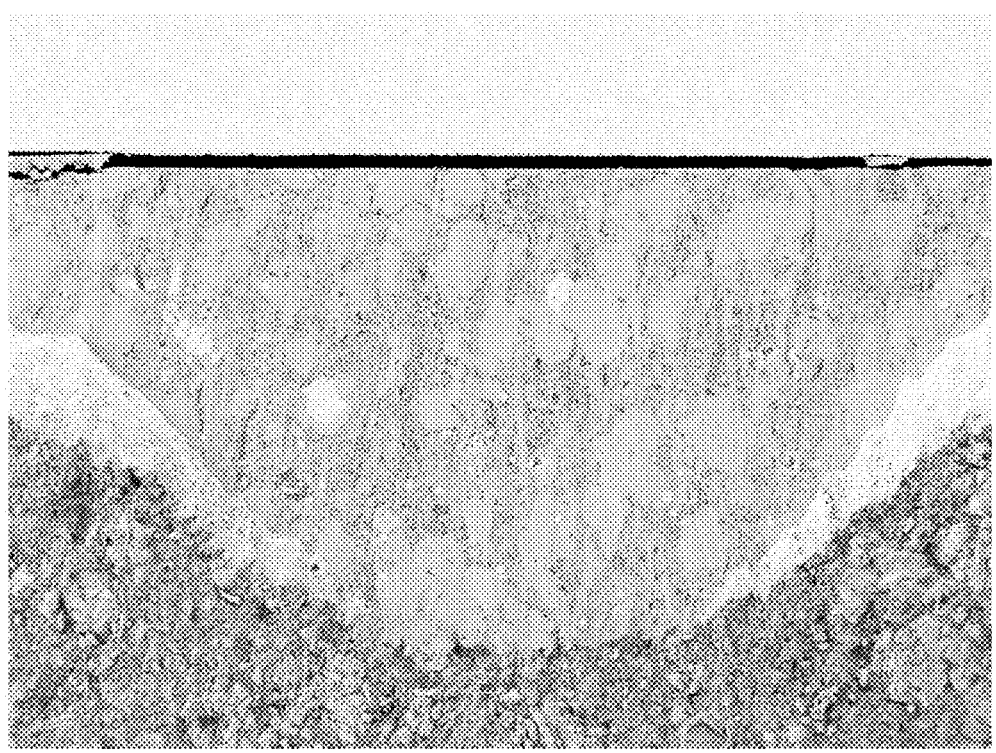
Figure 1: Example of 2D image of a rock sample.
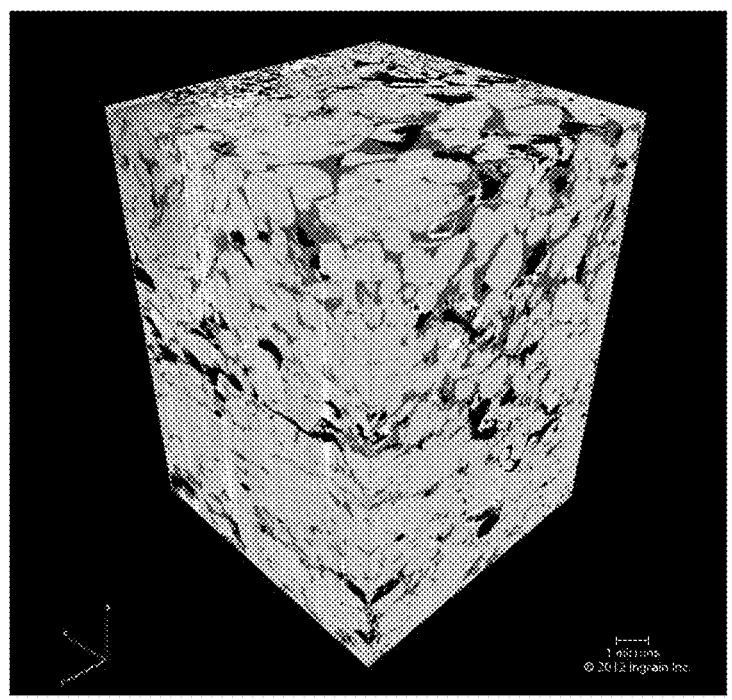
Figure 2: Example of a 3D image of a rock sample.

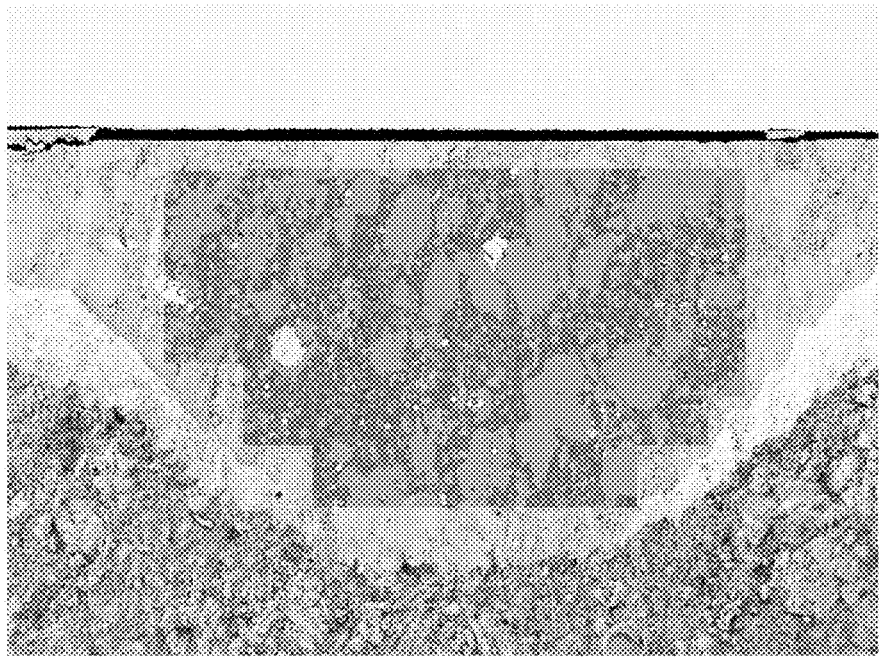
Figure 3: Example of fabrics detected and segmented in a 2D image of a rock sample. Different rock fabrics are highlighted with different colors.
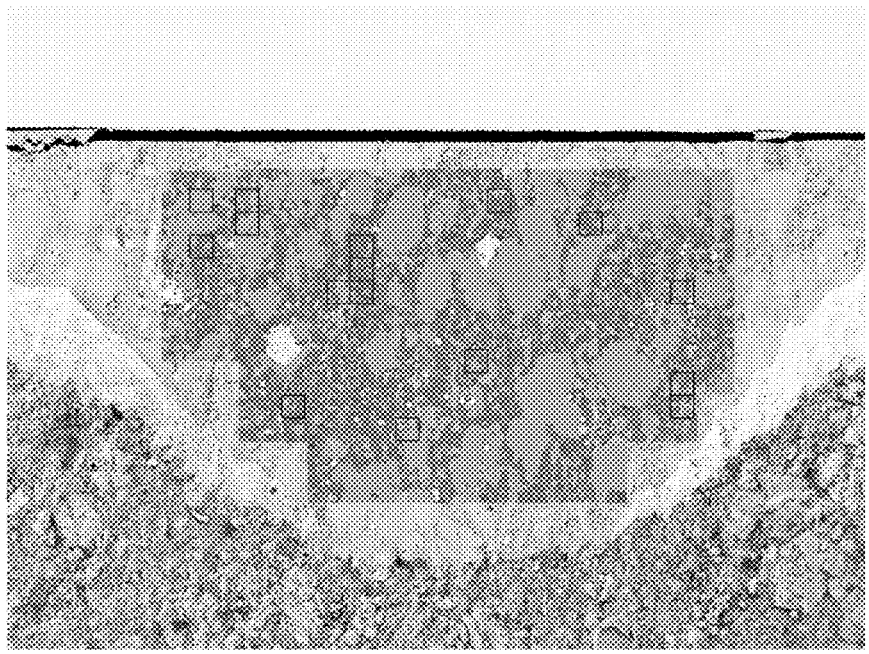
Figure 4: Example of fabric-segmented 2D image with suggested representative areas.

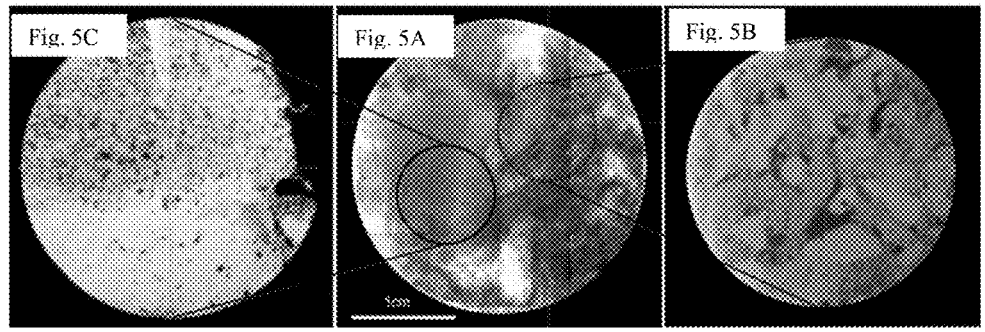
Figures 5A, 5B and 5C: High resolution detail (left and right) of the circle areas in a low resolution image (middle).
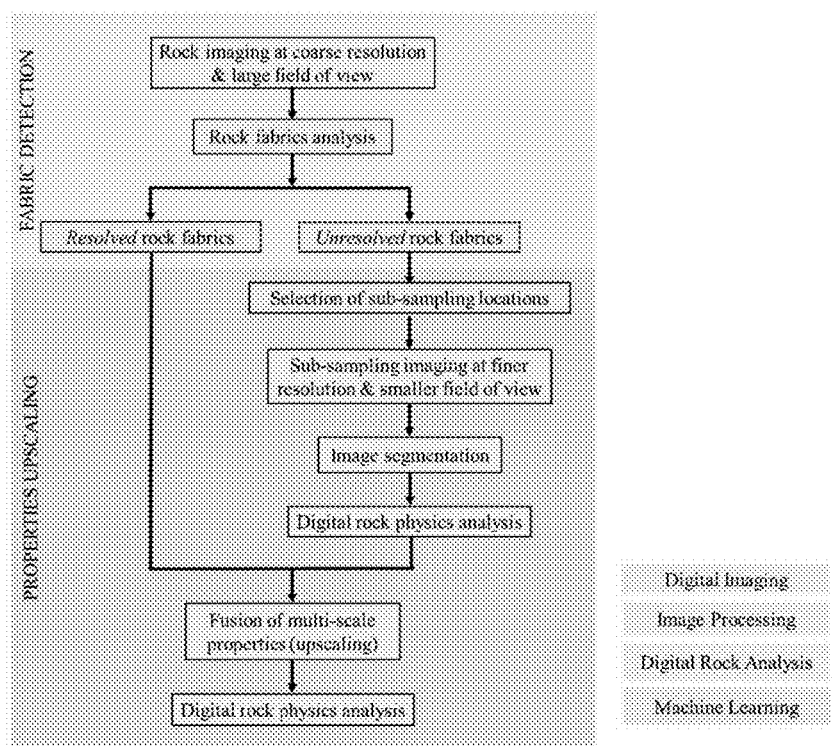
Figure 6: Flow diagram of present multi-scale imaging and upscaling workflow.

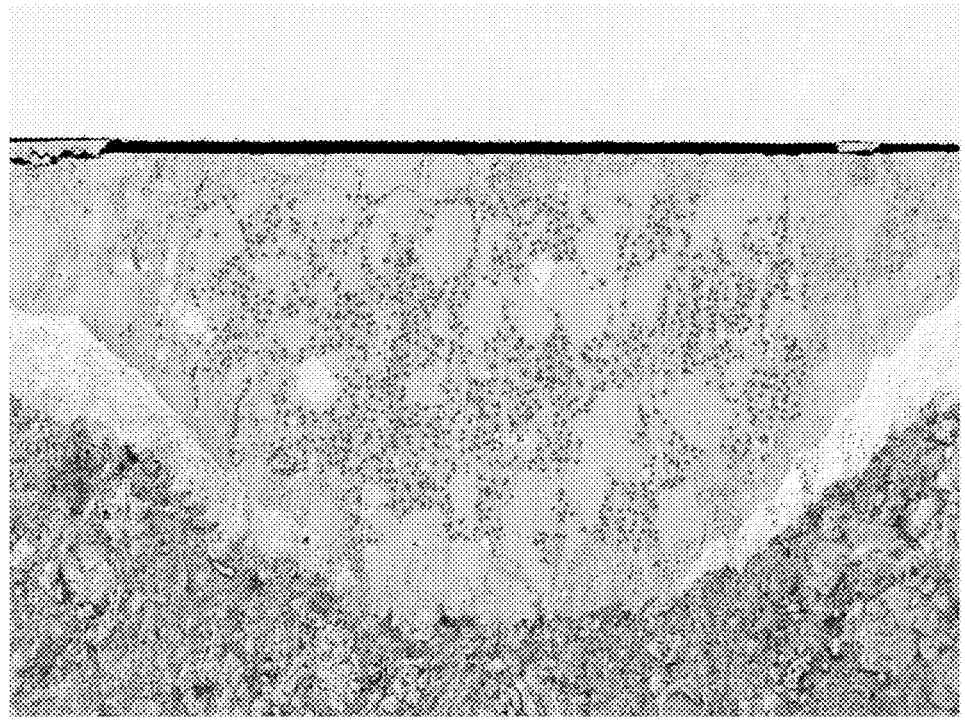
Figure 7: Example of points within resolved and unresolved rock fabrics in a 2D rock image.
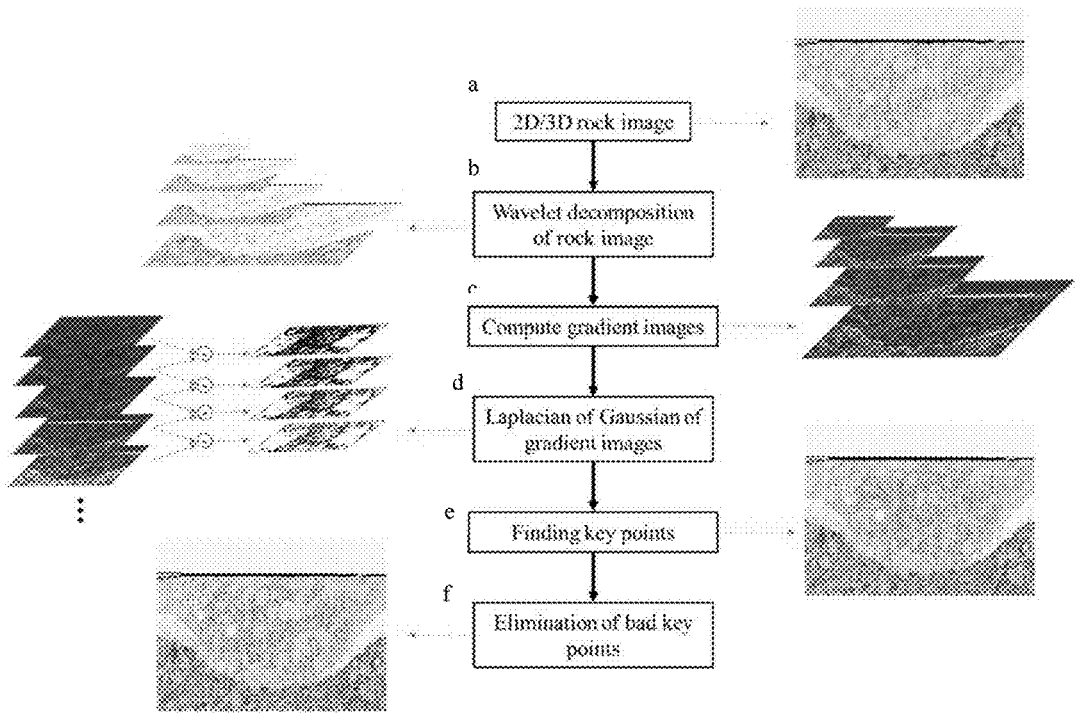
Figure 8: Flow diagram of present rock fabric descriptors (key points) detection method.

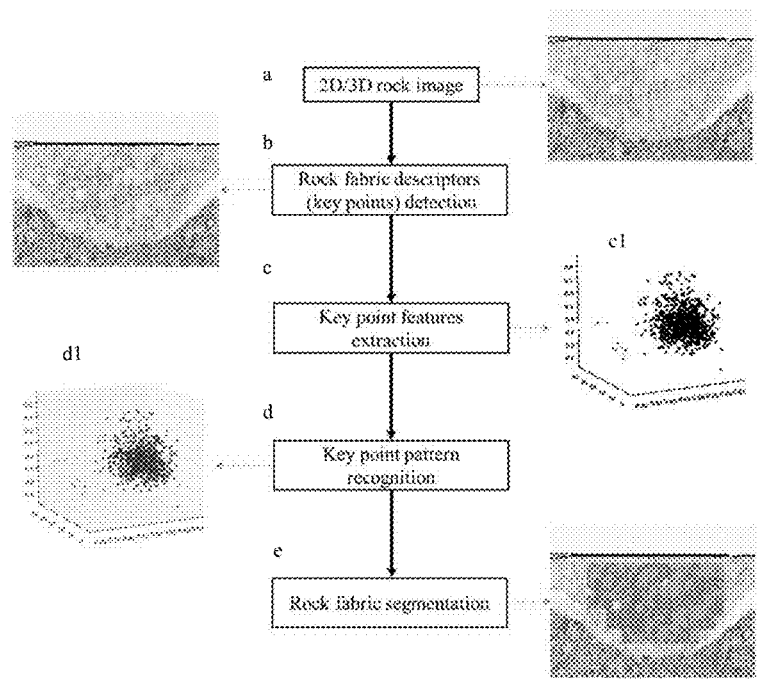
Figure 9: Flow diagram of present rock fabric analysis method.
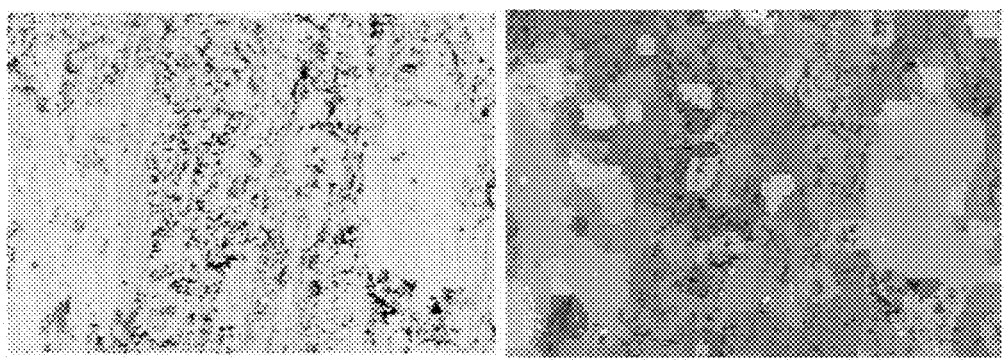
Fig. 10A                                    Fig. 10B
Figures 10A and 10B: Comparison between a 2D image of a rock sample (left) and a 2D fabric-segmented image of similar rock sample (right).

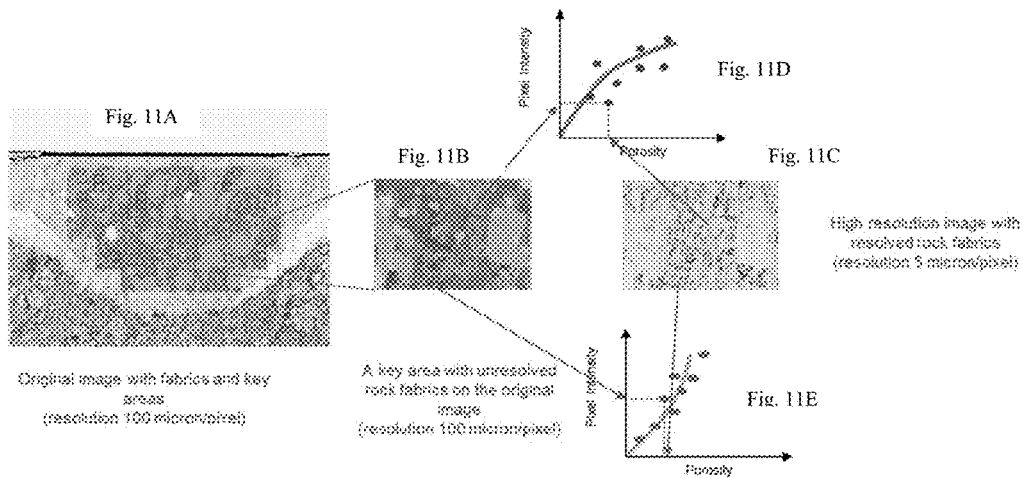
Figures 11A-11E: Extraction of multi-scale correlations using fabric information on coarse-resolution image and high-resolution resolved image.
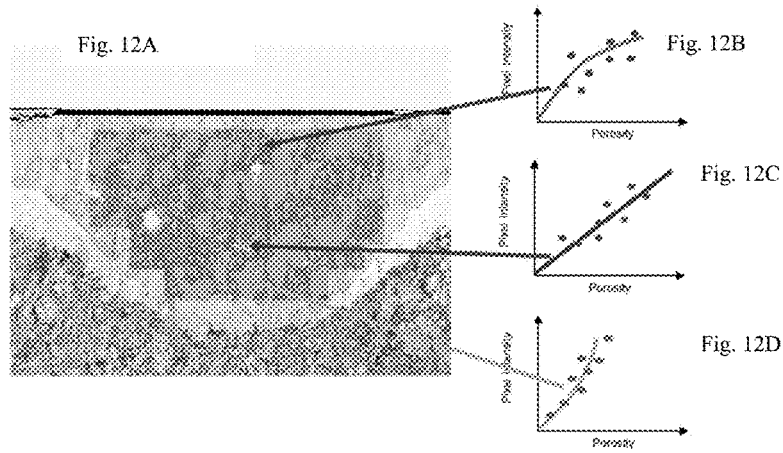
Figures 12A-12D: Upscaling of multi-scale correlations to fabric-segmented image.

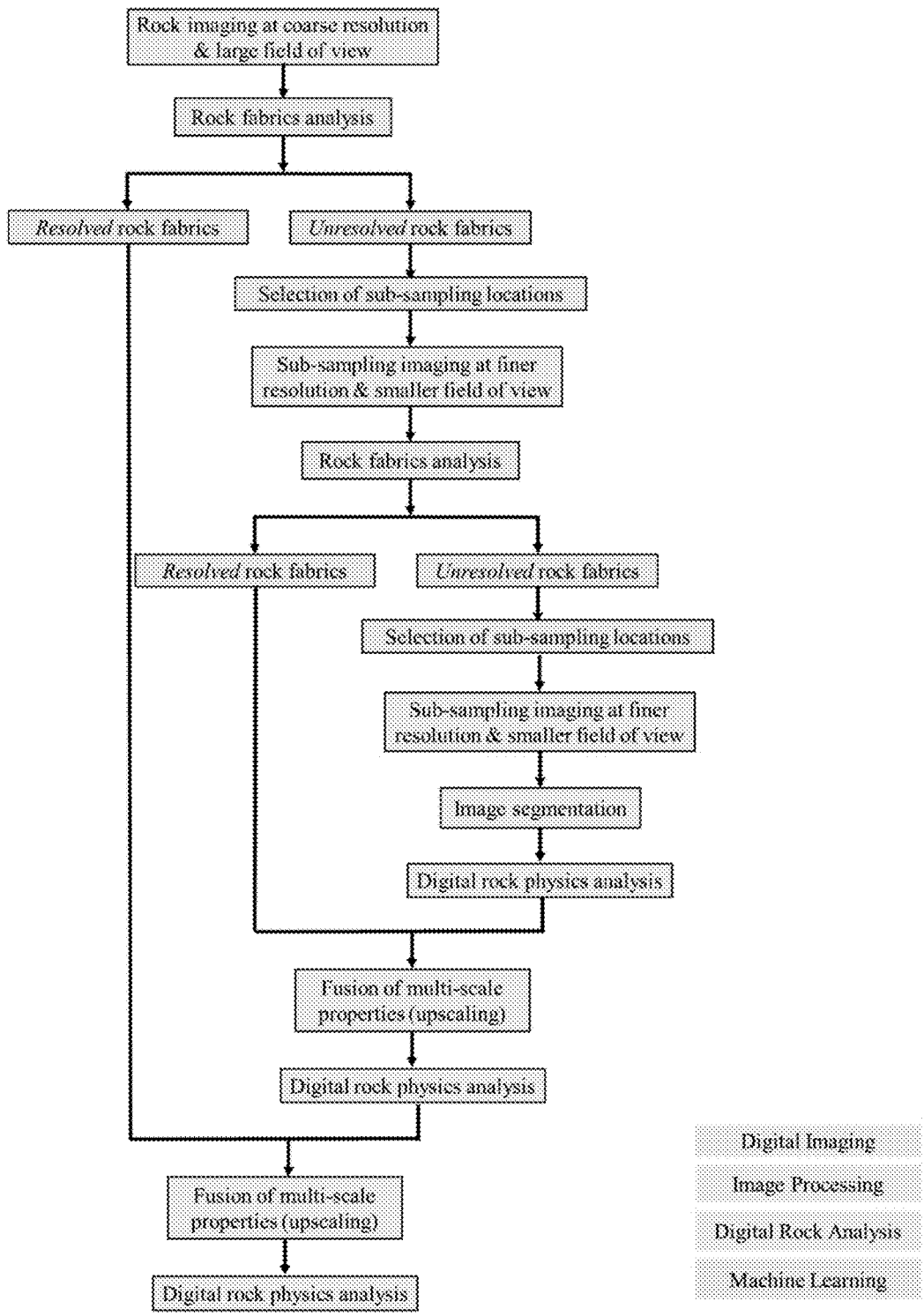
Figure 13: Flow diagram of present iterative multi-scale imaging and upscaled DRP.

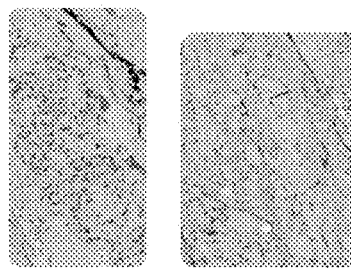
Figure 14A and 14B: Examples of resolved image (left) and unresolved image (right) rock fabrics.
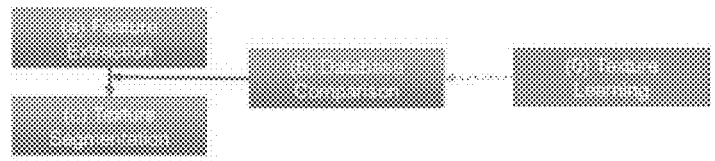
Figure 15: Flow diagram of typical supervised texture analysis process.
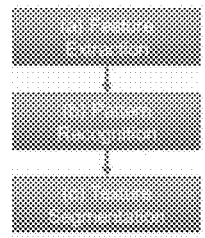
Figure 16: Flow diagram of typical unsupervised texture analysis process.
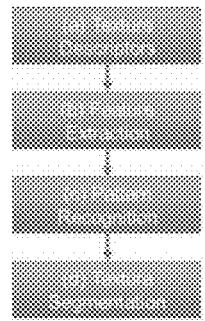
Figure 17: Flow diagram of texture analysis process.

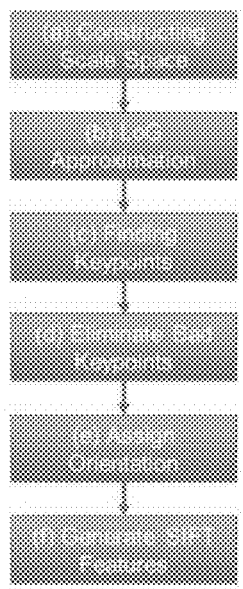
Figure 18: Flow diagram for SIFT process.

METHOD FOR DETERMINING FABRIC AND UPSCALED PROPERTIES OF GEOLOGICAL SAMPLE

This application claims the benefit under 35 U.S.C. § 119(e) of prior U.S. Provisional Patent Application No. 62/147,977, filed Apr. 15, 2015, which is incorporated in its entirety by reference herein.

FIELD OF THE INVENTION

The present invention relates to a method for determining fabrics of rock or other geological samples and upscaled properties of a geological sample. The present invention also relates to a system for the method.

BACKGROUND OF THE INVENTION

A thorough understanding of the fundamental structure and transport properties in a rock is crucial for the efficient exploration and economic production of hydrocarbons, such as manifested in complex multi-scale networks of clays, organic matter and pores (i.e. fabric).

Natural rocks are known to inherit complex heterogeneous structures with a broad spectrum of length scales, for example, pores diameter may be in nanometer to millimeter scale within the a rock. Natural rocks also are known to exhibit scale-dependent properties. Dvorkin, J., Derzhi, N., Diaz, E., Fang, Q., "Relevance of computational rock physics," *Geophysics*, (2011) 76, pp. E141-E153. Methods for measurement of rock properties have been proposed and presented in the literature. Ehrenberg, S. N., "Whole core versus plugs: Scale dependence of porosity and permeability measurements in platform carbonates," *AAPG Bulletin*, (2007) 91, pp. 835-846. However, it is rarely feasible to perform laboratory measurements of large-scale rock samples. In addition, measurements of small-scale rock samples are typically limited to a small amount of samples due to extensive time and expenses requirements.

Digital rock physics (DRP) is becoming a standard tool for rock property analysis. DRP utilizes two-dimensional (2D) and three-dimensional (3D) digital images of a rock sample to analyze petrophysical and geological properties. E.g., Curtis, M., et al., Investigation of the relationship between organic porosity and thermal maturity in the Marcellus shale, SPE144370, 2011; Curtis, M., et al., Structural characterization of gas shales on the micro- and nano-scales, CUSG/SPE137693, 2010; Lemmens, H., et al., Multiscale imaging of shale samples in the scanning electron microscope, in Camp, W., et al., eds., Electron microscopy of shale hydrocarbon reservoirs, AAPG Memoir 102, 2013. Images of these microstructures and their fabric can be found such as in Camp W., et al., Electron microscopy of shale hydrocarbon reservoirs, 2013. Techniques for high-resolution two and three dimensional imaging (e.g., Focused Ion Beam-Scanning Electron Microscopy (FIB/SEM), micro-computer tomographic (micro-CT)) are increasingly used in visualization and understanding these microstructures. However, the DRP imaging techniques can provide only a limited field of view, typically on an order of 1 µm². Lemmens, H., et al., AAPG Memoir 102, 2013. Accordingly, less than 1% of a 1-inch core plug may be imaged. This raises a question if the acquired area is relevant to the physics of the whole rock.

There have been attempts to capture a larger field of view of geological samples. E.g., Lemmens, H., et al., AAPG Memoir 102, 2013; Goergen, E. T., et al., Integrated petrophysical properties and multi-scaled SEM microstructural characterization, URTeC 1922739, 2014; Curtis, M. E., et al., Mapping of organic matter distribution on the centimeter scale with nanometer resolution, URTeC 1922757, 2014. The so-called large-scale imaging is created by tiling and stitching multiple images into mosaics. Despite its potential, this technique has required infeasible amounts of resources and time. Nevertheless, the technology could be essential as demand for larger field of view continues to grow. A multi-scale imaging and upscaling technique based on image registration for sandstone has been presented. Botha, P., et al., Multi-scale imaging and cross-property correlations in heterogeneous sandstone, SCA2014-021, 2014. Botha et al. acquire images of a sample at multiple scales (and field of view). Information on a smaller scale image is used as a calibration for a larger scale image. This technique may have more potential, in terms of present applications, than the previous one. However, the technique remains immature and still is the subject of ongoing research. Another technique is presented by Jin, C., et al., An automated machine-learning procedure for robust classification of SEM images of cross-laminated sandstones for digital rock analysis, SCA2014-034, 2014. Jin et al. have proposed a machine learning-based method for classification of images of cross-laminated sandstones, wherein its main purpose is to identify laminae, and the method shows an application of machine learning in image analysis.

Detailed information from a large field of view could increase the relevance and reliability of rock sample imaging for the characterization of a reservoir. Available technologies, however, are infeasible in term of accuracy and/or (time and resource) expenses. A novel multi-scale digital rock physics technology that can be used to analyze a practically large-scale rock sample with economic expenses is needed.

SUMMARY OF THE INVENTION

A feature of the present invention is a method which provides upscaling of rock properties, such as petrophysical properties, resolved from small scale samples to larger or even largest possible-scale samples to enable characterization of a rock sample at a large scale for improved reservoir evaluation.

A further feature of the present invention is a system for making such determinations.

To achieve these and other advantages and in accordance with the purposes of the present invention, as embodied and broadly described herein, the present invention relates, in part, to a method for determining fabric of a geological sample, comprising a) detecting texture descriptors (key points) for at least one digital image of a geological sample; b) feature extracting using the texture descriptors to quantitatively represent texture using a model; c) pattern recognizing for feature classification which defines clusters of key points corresponding to a perceptually homogenous texture; and d) texture segmenting to construct area/volume based on the feature clusters.

The present invention further relates to a method for detecting texture descriptors (key points) which comprises a) wavelet decomposition of a digital image of a geological sample to achieve multi-scale images; b) computation of gradient images to capture local change in image intensity; c) Laplacian of Gaussian of the gradient images to amplify the present of textures; d) finding key points to locate points within textures; e) elimination of bad key points to limit further analysis to meaningful areas.

The invention further includes a method to optimize the number and size of small scale samplings using spatial optimization of key points obtained from the above procedures.

A system for performing the methods is also provided.

It is to be understood that both the foregoing general description and the following detailed description are exemplary and explanatory only and are intended to provide a further explanation of the present invention, as claimed.

The accompanying figures, which are incorporated in and constitute a part of this application, illustrate various features of the present invention and, together with the description, serve to explain the principles of the present invention. The features depicted in the figures are not necessarily drawn to scale. Similarly numbered elements in different figures represent similar components unless indicated otherwise.

BRIEF DESCRIPTION OF THE DRAWINGS

FIG. 1 shows an example of a two-dimensional (2D) image of a rock sample.

FIG. 2 shows an example of a three-dimensional (3D) image of a rock sample.

FIG. 3 shows an example of fabrics (textures) detected and segmented in a 2D image of a rock sample. Different rock fabrics are highlighted with different colors.

FIG. 4 shows an example of fabric-segmented 2D image with suggested representative areas according to an example of the present application.

FIG. 5A shows a low resolution image and FIGS. 5B and 5C (right and left) show high resolution detail of the circled areas in the low resolution image.

FIG. 6 shows a process flow diagram of a multi-scale imaging and upscaling workflow for rocks according to an example of the present application.

FIG. 7 shows an example of points within resolved and unresolved rock fabrics in a 2D rock image according to an example of the present application.

FIG. 8 shows a process flow diagram of a rock fabric descriptors (key points) detection method according to an example of the present application.

FIG. 9 shows a process flow diagram of a rock fabric analysis method according to an example of the present application.

FIGS. 10A and 10B shows a comparison between a 2D image of a rock sample (left) and a 2D fabric-segmented image of similar rock sample (right) according to an example of the present application.

FIGS. 11A, 11B, and 11C show extraction of multi-scale correlations using fabric information on coarse-resolution image and high-resolution resolved image with the original image shown in FIG. 11A, an unresolved key area in FIG. 11B, and a high-resolution image of resolved rock fabrics in FIG. 11C, according to an example of the present application. FIGS. 11D and 11E are plots of pixel intensity versus porosity for locations indicated by arrows in FIGS. 11B and 11C.

FIG. 12A shows upscaling of multi-scale correlations to fabric-segmented image for the image shown therein, and FIGS. 12B, 12C, and 12D are plots of pixel intensity versus porosity for locations indicated by arrows in FIG. 12A, according to an example of the present application.

FIG. 13 shows a process flow diagram of an iterative multi-scaling imaging and upscaled DRP, according to an example of the present application.

FIGS. 14A and 14B show examples of resolved in the upper right area (left figure) and unresolved image (right figure) rock fabrics.

FIG. 15 shows a flow diagram of typical supervised texture analysis process.

FIG. 16 shows a process flow diagram of typical unsupervised texture analysis process.

FIG. 17 shows a process flow diagram of texture analysis process according to an example of the present application.

FIG. 18 shows a process flow diagram for SIFT process.

DETAILED DESCRIPTION OF THE INVENTION

The present invention relates to a method for determining fabric or texture and upscaled properties of geological samples, such as rock samples or other samples.

A method of the present invention can begin, as a first step, with digital imaging of a rock sample at a large scale to produce an overview image. In a second step, rock fabrics in the overview image can be detected and segmented using a novel rock fabric analysis method described herein. Rock fabrics are different from image texture commonly encountered in computer vision. The main difference is that rock fabrics tend to have pattern at individual pixel level not at edge or blob level. The novel rock fabric analysis method of the present invention detects rock fabric key points. The resulting key can be mostly or entirely located within an area with a rock fabric. Then, rock fabric features of the area around the key points are computed using a method described herein which can involve machine learning. In this method, multiple, e.g., four rock fabric features (i.e. attributes), e.g., contrast, homogeneity, entropy, and variance, are used. For visualization purpose, key points can be described by three rock fabric features, i.e. 3D feature space. Consequently, the key points are clustered using the rock fabric features, such as the four rock fabric features. An unsupervised machine learning (ML) method can be used in the inventive method for clustering of high-dimensional data. It can automatically learn data and find an appropriate number of clusters. Based on an understanding of natural rock images, it is reasonable to postulate that key points within similar cluster are similar rock fabric. This can be confirmed by visual observation. These clusters can be used as a model for segmentation of the whole overview. During the segmentation, rock fabric features of every pixel/voxel can be computed.

Digital rock physics (DRP) has become increasingly important in understanding and estimating rock properties in oil and gas industry, albeit with possible limitations as indicated. The first step of DRP is the imaging step where a rock sample is digitized into a 2D and/or 3D model. The rest of DRP steps, such as digital image processing to categorize pixels/voxels (in 2D and 3D, respectively) and digital rock analysis to digitally model desired rock properties using the digital image of the rock sample, can be based on this model. The following discussions are applicable for both 2D and 3D images. For the sake of simplicity, the term "image" refers to 2D and 3D images and "pixel" refers to both image pixel and voxel, unless otherwise stated. As indicated, due to limitations in imaging technology and multi-scale nature of rocks, less than 1% of a rock may be acquired using DRP alone, which may raise questions concerning relevancy, accuracy, representativeness and applicability of the model by itself.

A method of the present invention is based in part on the fact that a rock sample consists of multi-scale fabrics (i.e.

building blocks) intermixed spatially. Detailed information from a larger field of view via multi-scale imaging can be a key to make DRP more reliable, accurate and relevant. In the present invention, a method for a multi-scale imaging of a rock is presented that is based on integration of computer vision and machine learning. Detailed knowledge of these fabrics can lead to understanding of the whole rock. First, the process can start at acquiring a rock sample image at a desired scale (see FIG. 1 and FIG. 2 for examples of 2D and 3D image of a rock sample, respectively). Points within resolved and unresolved rock fabrics are detected. Then, the fabric's features around the points are extracted. Consequently, the points are categorized using unsupervised machine learning into distinct fabrics. FIG. 3 shows regions with different fabrics highlighted by different colors. Set of areas (i.e. sub-sample) within the image, which can be used to represent and/or characterize the whole image, is determined, see FIG. 4. For areas with resolved fabrics, properties such as porosity, pore size distribution, permeability, electrical conductivity and capillary pressure are analysed directly. For areas with unresolved fabrics, a higher resolution image of the area is acquired and properties are analysed using the high resolution image. Together with knowledge concerning spatial arrangement of fabrics, properties of the whole sample can be populated and accurately upscaled. In a case that a high resolution image is not sufficiently resolved fabrics residing within it, the process can be repeated recursively.

Technology for multi-scale 2D and 3D imaging and upscaling for reservoir rocks is further described in this section. The goal of the proposed technology is to achieve large-field-of-view information while keeping expenses feasible. Principally, the technology is based on a knowledge that a rock consists of multi-scale fabrics (i.e. building blocks) intermixed spatially which cannot be captured using only single resolution image acquisition, see FIGS. 5A, 5B and 5C. Detailed knowledge of all fabrics can lead to a more thorough understanding of the whole rock sample.

The workflow of a method of the present invention can be divided into two phases, which are phase I: fabric detection and recognition and phase II: upscaling. A flow diagram of phase I and phase II are shown on the top and bottom of FIG. 6, respectively. At the beginning of phase I, a 2D and/or 3D image of a rock sample is acquired at desired resolution. Examples of the acquired images in 2D and 3D are shown in FIGS. 1 and 2, respectively. The process flow typically starts with digital imaging of a rock sample or other sample at large field of view or scale (overview) acquisition. In the fabric recognition step (FIG. 9), points within resolved and resolved rock fabrics are detected (FIG. 7). A novel key point detection algorithm (FIG. 8) developed for rock fabrics is used. A more detailed description of the algorithm is presented in section a. herein. Consequently, a proper set of image features around these points are computed. Example of image features include Haralick's features, local binary pattern and Gabor wavelets. E.g., Materka, A., et al., Texture analysis methods—A review, Technical University of Lodz, Institute of Electronics, COST B11 report, Brussels, 1998; Hu, C., et al., Automatic segmentation of high-resolution satellite imagery by integrating texture, intensity, and color features, Photogrammetric Engineering & Remote Sensing, 1399, December 2005; Antel, S. B., et al., Automated detection of focal cortical dysplasia lesions using computational models of their MRI characteristics and texture analysis, NeuroImage 19, pp. 1748-1759, 2003; Signolle, N., et al., Wavelet-based multiscale texture segmentation: Application to stromal compartment characterization on virtual slides, Signal Processing 90, pp. 2412-2422, 2010; Unser, M., Texture classification and segmentation using wavelet frames, IEEE Transactions on Image Processing, vol. 4, no. 11, 1995; Melendez, J., et al., Unsupervised texture-based image segmentation through pattern discovery, Computer Vision and Image Understanding 115, pp. 1121-1133, 2011.

Then, the features of each of the points are categorized/clustered within the feature space into groups of points with similar features value. Each group represents a rock fabric. FIGS. 10A and 10B show a comparison between a 2D image with its fabric-segmented counterpart. Using the knowledge obtained from the steps above, a set of areas that can be used to represent and/or characterize the whole rock sample is determined. Areas that contain only resolved fabrics can be directly used for property analysis in the next phase. A higher resolution image is acquired for the areas containing unresolved rock fabrics. An example of these areas is shown in FIG. 4. The knowledge regarding rock fabrics can be further used for many purposes. Examples include properties upscaling, rock classification and rock selection for experiments.

Phase II begins with properties analysis on the acquired high-resolution images for unresolved rock fabrics and/or directly on the original image for resolved rock fabrics. Examples of properties analysis include pore size distribution, porosity fraction, and organic fraction as well as transport properties. The original image (overview image) is segmented based on the fabric recognition step in phase I. Information obtained from properties analysis and knowledge about the fabrics can be upscaled to the whole rock sample in the last step. The upscaling step can be aimed mainly at the unresolved rock fabrics. It can be started by constructing an upscaling correlation. This is done by correlating a representative area derived from phase I on the original image with its high-resolution counterpart.

An illustrated example of multi-scale correlation extraction is showed in FIGS. 11A to 11E. It is assumed that an image, hereafter called the original image, acquired at relatively low resolution to cover a large field of view has a resolution per pixel of 100 micron. Fabrics within the original image are detected and segmented using the procedure in phase I. In addition, areas that can be used to represent and/or characterize the original image are determined and shown in FIG. 11A (left). In order to obtain a clearer view for this discussion, a view of an area with unresolved rock fabrics in the original image is shown in FIG. 11B (center) for an indicated area of FIG. 11A. Rock fabrics are highlighted into regions intermixed spatially. A high-resolution image of the area is shown in FIG. 11C (right). It is assumed that the resolution of this image is 5 micron per pixel and all rock fabrics are satisfactorily resolved. That is, one pixel in the original image is equal to 20×20 pixels in the high-resolution image. Property analysis, hereby the property of interest is assumed to be porosity, is carried out on the high resolution image. Then, a multi-scale correlation for porosity of a fabric is extracted by correlating the pixel intensity of the original image (based on 1 pixel) with the porosity fraction (computed using 20×20 pixels) from the high resolution image. The process is repeated for all pixels with similar fabric. An example of extracted multi-scale information is shown as points in the top plot in FIG. 11D (and lower plot in FIG. 11E). Similar process is performed for all available fabrics in the high resolution image. The process is repeated for all available high resolution images in conjunction with the suggested areas in the original image. A multi-scale correlation is achieved using a regression method such as linear regression, polynomial regression, and logistic regression for all individual fabrics separately. At this point, the correlation between the pixel intensity of the original image and its porosity for each unresolved fabrics is known. In the next step, the correlations are used to populate the porosity on every pixel in the original image based on its fabric (FIGS. 12A to 12D). The upscaled porosity is simply the summation of porosity in every pixel in the original image. It is important to note that, while the example above describes porosity upscaling process, it can be used for upscaling other properties such as permeability, organic fraction, pore size distribution as well as geometric properties and transport properties. If needed, the process can be repeat recursively to obtain information for/from multiple scales (an example of such process is shown in FIG. 13).

a. Image Fabric Analysis

In the present context, a fabric is defined as a region within an image with similar contents/characteristics. Regions with similar fabric can be described by a set of spatial variation of pixel intensities. It can be resolved (e.g. fabric of pores) or unresolved (e.g. repeating pattern of pixel intensities), see e.g. FIGS. 14A and 14B. It can be easily detected by human vision but is extremely difficult to reformulate into a computer program.

Since the end of 1980s, researchers have proposed approaches for fabric/texture analysis. An example of texture analysis works can be found, for example, in Materka, A., et al., Texture analysis methods—A review, Technical University of Lodz, Institute of Electronics, COST B11 report, Brussels, 1998; Unser, M., Texture classification and segmentation using wavelet frames, IEEE Transactions on Image Processing, vol. 4, no. 11, 1995; Melendez, J., et al., Unsupervised texture-based image segmentation through pattern discovery, Computer Vision and Image Understanding 115, pp. 1121-1133, 2011. Its applications include, but are not limited to, remote sensing, such as in Hu, C., et al., Automatic segmentation of high-resolution satellite imagery by integrating texture, intensity, and color features, Photogrammetric Engineering & Remote Sensing, 1399, December 2005, and medicine, such as in Antel, S. B., et al., Automated detection of focal cortical dysplasia lesions using computational models of their MRI characteristics and texture analysis, NeuroImage 19, pp. 1748-1759, 2003; Signolle, N., et al., Wavelet-based multiscale texture segmentation: Application to stromal compartment characterization on virtual slides, Signal Processing 90, pp. 2412-2422, 2010.

Texture analysis can be divided roughly based on knowledge about textures as supervised and unsupervised analysis. In a supervised analysis, e.g. Unser, M., Texture classification and segmentation using wavelet frames, IEEE Transactions on Image Processing, vol. 4, no. 11, 1995, all textures are known a priori. Features of these textures (e.g. contrast, homogeneity, co-occurrence of pixel intensities and filter coefficients) are extracted, modeled and stored in a database (FIG. 15-0). An image (usually consists of multiple textures) is divided into overlapping or non-overlapping tiles. Features similar to those used in texture learning step are extracted from each tile (FIG. 15-a). They are compared with the database in FIG. 15-b. Similarities between extracted features and stored features are measured. Criteria such as Euclidean distance or Mahalanobis distance may be used. A texture class from database is assigned to the tile (FIG. 15-c). The steps are repeated throughout the image resulting in a texture segmented image. In contrast, an unsupervised analysis (FIG. 16), such as in Melendez J., et al., Unsupervised texture-based image segmentation through pattern discovery, Computer Vision and Image Understanding 115, pp. 1121-1133, 2011, does not require a priori knowledge about textures, i.e. training data. Similar to the supervised analysis, features of each tile are extracted in the first step (FIG. 16-a). Patterns within the extracted features (sometime called feature vectors) are recognized using a classification algorithm (e.g. support vector machine), see FIG. 16-b. Then all tiles are categorized and assigned their texture class (segmented) in the last step (FIG. 16-c).

As indicated, Digital Rock Physics (DRP) process begins with an acquisition of 2D and/or 3D images of a rock sample. Andra et al., Digital rock physics benchmarks—Part I: Imaging and segmentation, Computers & Geosciences 50, pp. 25-32, 2013; Andra et al., Digital rock physics benchmarks—Part II: Computing effective properties, Computers & Geosciences 50, pp. 33-43, 2013. The rest of the DRP process is based on these images. As also indicated, due to limitations in imaging technology and multi-scale nature of rocks, less than 1% of a rock may be acquired or selected for higher resolution acquisition. Lemmens, H., et al., Multiscale imaging of shale samples in the scanning electron microscope, in Camp, W., et al., eds., Electron microscopy of shale hydrocarbon reservoirs, AAPG Memoir 102, 2013. One of the challenges is that rock fabrics arrange themselves in a highly random manner. Dividing images into tiles leads to over estimation and classification of fabrics.

In order to solve this problem, a fabric descriptor extraction step is introduced to the unsupervised approach (FIG. 17). This process involves an extraction of descriptors (i.e., key points) where features will be consequently extracted. The most popular key points extraction process is called SIFT (Scale Invariant Feature Transform). A process flow for SIFT is shown in FIG. 18. SIFT is described in more detail in Lowe, D. G., Distinctive image features from scale-invariant keypoints, Int. J. Computer Vision, 2004, and in U.S. Pat. No. 6,711,293 B1 to Lowe. The goal of SIFT is to detect features around corners in images. It has been widely used in object recognition, image matching, etc. First, a scale space is created using a blurring filter kernel such as Gaussian on an image. Then, the image is scaled down and blurring kernel is repeated. The Laplacian-of-Gaussian (LoG) is approximated using a Difference-of-Gaussian (DoG) approximation. Key points are local minima/maxima in these DoG images. Some of these key points are eliminated by removing key points at low intensities and/or edges. An oriented histogram of each of the key points is constructed from gradient orientations around the key points. The histogram will be used to generate a SIFT feature which typically has 128 dimensions.

In a method for key points extraction, an algorithm for detecting rock fabrics (not edges) has been developed (FIG. 8). Its purpose is solely to extract key points. First, a discrete wavelet transform is used to create images at different resolution as well as to extract their spatial coefficients. Gradients as well as blurring of these images are computed in the following step. Then, preliminary key points are extracted using LoG on the gradient images. In contrast to SIFT process, only local maxima points are captured. Here, key points at edges and corners are eliminated resulting in key points located mainly within textures. For example, key points at edges of the rock features can be eliminated by limiting key points within a specified value of the maxima.

As an example, a rock key point detection algorithm of a method of the present invention, such as shown in FIG. 8, can begin on the (a) 2D/3D rock image with (b) discrete wavelet decomposition of the image up to desired level. This step ensures that rock fabrics at multiple scales will be captured. Then, (c) pixel/voxel gradient of images obtained from the previous step is computed. (d) Laplacian of Gaussian (LoG) is computed on the gradient images to locate points of variation of pixel/voxel intensity. (e) Key points detection within rock fabrics are detected by locating maxima in LoG images. (f) Key points at the edges of rock features can be eliminated by limiting key points within certain value of maxima (e.g. 80% of maxima, or other values).

FIG. 9 shows a process flow of a method according to an example of the present invention. The sequence of the steps is indicated by the arrows in the figure. Rock fabric descriptors (i.e. key points) are detected in step (b) on the 2D/3D rock image of (a). FIG. 8 shows an example of a process flow for carrying out step (b) in FIG. 9. After rock fabric descriptors (i.e. key points) are detected (FIG. 9-b), such as by the process shown in FIG. 8, the present fabric analysis continues by an extraction of features (FIG. 9-c). As indicated, FIG. 8 is an example of a result from step (b) in FIG. 9. Since the extracted features often exhibit complex arrangement and clustering, such as shown in FIG. 9-c1, a pattern recognition step, which can comprise machine learning, can be used for clustering the data (FIG. 9-d and FIG. 9-d1). The pattern recognition step can comprise a method capable of clustering or classifying the data related to the extracted features. A method can be used for this step which can automatically identify clusters (i.e., a pattern) from multi-dimensional data. At the end of this step, a mathematical model for fabric classes can be created. The key points are clustered and highlighted based on their data density and location in the feature space. Additional information on this step is provided in section b. herein. In the last step of the method, features from every one of the pixels in the rock image are extracted. The extracted features are compared to the fabric model. The pixel is assigned to one of the fabric classes (i.e. segmentation). Rock fabric segmentation is indicated as step (e) in the process flow of FIG. 9. The analysis in this example is done in four dimensional feature space. Four rock fabric features (i.e. attributes), namely contrast, homogeneity, entropy, and variance, can be used. The axes in FIGS. 9-c1 and 9-d1 refer to image features, such as contrast, homogeneity and correlation of pixel pairs.

b. Machine Learning

It is known that features of rock fabrics, especially the unresolved rock fabrics, are in pixel/voxel level. Additionally, similar rock fabric may have different orientations in an image. Therefore, a model that quantitatively describes rock fabric features and is rotation invariance is selected. Note that, for the sake of naming consistency, rock fabric features (in DRP) are used interchangeably with texture features (in computer vision). Haralick texture features can be used, which based on gray-level co-occurrence matrix (GLCM). Haralick, R. M., "Statistical and structural approaches to texture," *Proc. IEEE*, (1979) 67, pp. 1786-804. They can be used to quantify spatial distribution and auto-correlation of pixel/voxel pairs. The GLCM, $P_{i,j}$, is constructed from probability of intensity j next to intensity i in defined directions and distance. An appropriate set of Haralick texture features can be selected to obtain maximum separation between rock fabrics (for following features classification) namely, (1) contrast, (2) homogeneity, (3) entropy, and (4) variance. Their mathematical description can be found in the Haralick paper. As indicated, during the segmentation, rock fabric features of every pixel/voxel can be computed (assigned) to one of the fabric classes. Distance from clusters can be computed using, for example, Euclidean and Mahalanobis distance. A pixel can belong to a cluster with the shortest distance.

As indicated, FIG. 6 shows a process flow diagram of a method of the present invention which includes the indicated image fabric analysis and machine learning methods thereof. Steps are highlighted according to the tasks shown in the bottom. The multi-scale method discussed herein can be directly applied to two-, three- and four-dimensional rock images. 2D images are used herein only for the sake of simplicity.

The geological materials, also referred to herein as the geological samples, to which the present invention can be applied are not necessarily limited. The geological materials can be rocks, soils, or samples or subsamples thereof. The kinds of rock to which a method of the present invention can be applied are not necessarily limited. The rock sample can be, for example, organic mud rock, shale, carbonate, sandstone, limestone, dolostone, or other rocks, or any combinations thereof, or other kinds. The rocks can be porous or non-porous. Any source of a rock formation sample of manageable physical size and shape may be used with the present invention. Micro-cores, crushed or broken core pieces, drill cuttings, sidewall cores, outcrop quarrying, whole intact rocks, and the like, may provide suitable rock piece or fragment samples for analysis using methods according to the invention.

Systems which can be used for acquisition of digital images on geological samples are known in the industry, including, e.g., X-ray CT, micro X-ray CT, NMR, SEM, FIB-SEM, neutron scattering, thin sections, and high resolution photography. The system further can comprise one or more computer systems (or computer programs stored on a non-transitory computer-readable medium) for processing images and computing/determining image features in the inventive method. For example, the system or program can comprise one or more computer systems which can comprise software to capture images, process images, segment images, and/or determine image features, perform computations of the method, or any combinations thereof. The image processing used in the present methods can be done with visualization and computation software. The method of the present invention can be implemented using a graphics processing unit (GPU), for example, which results in a computational time approximately 100 seconds for a 2D image with a dimension of 2000×3000 pixels, or with other parameters. The indicated system or apparatus of the present invention may be suitable for analysing material in a laboratory in a building, or in-the-field, such as in a mobile transport vehicle or mechanism on the ground or underground.

The present invention includes the following aspects/embodiments/features in any order and/or in any combination:

1. A method for determining fabric of a geological sample, comprising:
  a) detecting texture descriptors (key points) for at least one digital image of a geological sample;
  b) feature extracting using the texture descriptors to quantitatively represent texture using a model;
  c) pattern recognizing for feature classification which defines clusters of key points corresponding to a perceptually homogenous texture;
  d) texture segmenting to construct area/volume based on the feature clusters.

2. The method of any preceding or following embodiment/feature/aspect, wherein the feature extracting in step b) comprises:
   i) discrete wavelet decomposing of the at least one digital image using a discrete wavelet transform to create images at different resolution;
   ii) computing pixel/voxel gradient of each image obtained from step i) to create gradient images;
   iii) computing Laplacian-of-Gaussian (LoG) on the gradient images to locate points of variation of pixel/voxel intensity;
   iv) key point detecting within rock fabrics by locating maxima in the LoG images;
   v) eliminating key points at edges of the rock features.
3. The method of any preceding or following embodiment/feature/aspect, wherein the eliminating of key points at edges of the rock features comprises eliminating key points within 80% of the maxima.
4. The method of any preceding or following embodiment/feature/aspect, wherein the eliminating of undesired key points in step v) comprises eliminating key points at edges and corners of the images.
5. The method of any preceding or following embodiment/feature/aspect, wherein the pattern recognizing uses machine learning to develop a mathematical model for fabric classes (clusters).
6. The method of any preceding or following embodiment/feature/aspect, wherein the texture segmenting comprises extracting features from every pixel and comparing the extracted features to the mathematical model for fabric classes wherein each of the pixels is assigned to one of the fabric classes.
7. A system to perform the method of any preceding claim.

The present invention can include any combination of these various features or embodiments above and/or below as set forth in sentences and/or paragraphs. Any combination of disclosed features herein is considered part of the present invention and no limitation is intended with respect to combinable features.

Applicant specifically incorporates the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:
1. A method for determining fabric of a geological sample, comprising:
   a) detecting key points for at least one digital image of a geological sample;
   b) feature extracting using the key points to quantitatively represent resolved and unresolved texture using a model;
   c) pattern recognizing for feature classification which defines clusters of key points corresponding to a perceptually homogenous texture;
   d) texture segmenting to construct resolved and unresolved area/volume based on the clusters of key points.

2. The method of claim 1, wherein the feature extracting in step b) comprises:
   i) discrete wavelet decomposing of the at least one digital image using a discrete wavelet transform to create images at different resolution;
   ii) computing pixel/voxel gradient of each image obtained from step i) to create gradient images;
   iii) computing Laplacian-of-Gaussian (LoG) on the gradient images to locate points of variation of pixel/voxel intensity;
   iv) key point detecting within rock fabrics by locating maxima in the gradient images on which LoG is computed in iii);
   v) eliminating key points at edges of features of the geological sample in the gradient images on which LoG is computed in iii).

3. The method of claim 2, wherein the eliminating of key points at edges of the geological sample comprises eliminating key points within 80% of the maxima.

4. The method of claim 2, wherein the eliminating of undesired key points in step v) comprises eliminating key points at edges and corners of the gradient images.

5. The method of claim 1, wherein the pattern recognizing uses machine learning to develop a mathematical model for fabric classes (clusters).

6. The method of claim 5, wherein the texture segmenting comprises extracting features from every pixel and comparing the extracted features to the mathematical model for fabric classes wherein each of the pixels is assigned to one of the fabric classes.

7. The method of claim 1, wherein the at least one digital image having key points detected in step a) is at least one three-dimensional image of the geological sample.

8. The method of claim 1, wherein the geological sample is a rock sample.

9. The method of claim 8, wherein the rock sample is selected from micro-cores, core pieces, drill cuttings, sidewall cores, outcrop quarrying, or whole intact rocks.

10. A system for determining fabric of a geological sample, comprising:
   i) a digital image acquisition system for obtaining digital images on a geological sample, wherein the digital image acquisition system is selected from at least one of X-ray computed tomography (CT) scanner, micro X-ray CT, nuclear magnetic resonance (NMR) imaging system, scanning electron microscope (SEM), and focused ion beam-scanning electron microscope (FIB-SEM);
   ii) one or more computer systems comprising at least one processing unit and/or computer programs stored on a non-transitory computer-readable medium operable to a) capture digital images obtained by the digital image acquisition system, b) detect key points for at least one digital image of a geological sample, c) extract features using the key points to quantitatively represent resolved and unresolved texture using a model, d) recognize a pattern for feature classification which defines clusters of key points corresponding to a perceptually homogenous texture, and e) segment texture to construct resolved and unresolved area/volume based on the clusters of key points.

* * * * *